United States Patent [19]

Teare

[11] 4,298,413
[45] Nov. 3, 1981

[54] METHOD AND APPARATUS FOR PRODUCING CONCRETE PANELS

[76] Inventor: John W. Teare, 26 Hollytree Ct., Hamilton, Ohio 45011

[21] Appl. No.: 126,192

[22] Filed: Mar. 3, 1980

[51] Int. Cl.³ .......................... B28B 1/16; B28B 1/30; B28B 5/02; B65H 29/24; B65H 29/26; B29C 17/10
[52] U.S. Cl. .......................................... 156/42; 83/99; 83/402; 156/45; 156/269; 156/324; 156/510; 156/539; 264/145; 264/157; 264/171; 264/258; 264/316; 264/333; 271/211; 414/82; 414/903; 425/115; 425/122; 425/224; 425/289; 425/308; 425/324.1; 425/471
[58] Field of Search .............. 264/DIG. 43, 138, 157, 264/145, 333, 313, 316, 171, 213, 258; 425/115, 122, 224, 289, 308, 88, 338, 471; 156/39, 42, 44, 45, 246, 250, 253, 301, 324, 510, 269, 539; 428/308, 538; 52/600, 630; 414/82, 903; 83/29, 98, 99, 402; 271/211

[56] References Cited
U.S. PATENT DOCUMENTS

| | | | |
|---|---|---|---|
| 3,090,503 | 5/1963 | Curtenius | 414/903 |
| 3,284,980 | 11/1966 | Dinkel | 52/600 |
| 3,509,010 | 4/1970 | Metzger | 428/213 |
| 3,608,003 | 9/1971 | Klaue et al. | 264/42 |
| 3,901,634 | 8/1975 | Webb et al. | 425/115 |
| 3,993,822 | 11/1976 | Knauf et al. | 156/42 |
| 4,055,256 | 10/1977 | Hagedorn | 414/903 |
| 4,112,173 | 9/1978 | Roudebush et al. | 428/215 |
| 4,159,361 | 1/1979 | Shupak | 428/240 |
| 4,203,788 | 5/1980 | Clear | 156/39 |

Primary Examiner—W. E. Hoag

[57] ABSTRACT

The invention provides a process and apparatus for producing fabric-reinforced, thin concrete panels suitable as a backer board for construction materials such as ceramic tile, slate and thin brick. A process is described whereby the components of the panel are deposited on a web of disposable carrier/release material such as polyethylene coated paper while moving on a conveyer belt to form a continuous strip, the strip is cut into panels and the wet, uncured panels are stacked by means of an air-float stacking unit, then subsequently cured.

14 Claims, 4 Drawing Figures

METHOD AND APPARATUS FOR PRODUCING CONCRETE PANELS

BACKGROUND OF THE INVENTION

This invention relates to a method and apparatus for producing fabric-reinforced thin concrete panels and to an apparatus for stacking such panels. Such panels are described in U.S. Pat. No. 3,284,980, Paul E. Dinkel, and comprise a core of lightweight concrete with a surface layer of fabric secured to each face by means of a thin layer of hydraulic cement composition. The panels normally are ⅜ inch to ⅝ inch thick and are used in construction as a backer for ceramic tile, exposed aggregate, thin brick and other functional or decorative materials.

These thin concrete panels conventionally have been produced in individual molds of suitable size or other forms on a conveyer belt or on a forming table.

In the prior art, the methods employed tend to be labor intensive in that each form must be turned over or otherwise handled, to release its panel, then must be cleaned, treated with release agent and transported back to the beginning of the production cycle. The forms take up space in the curing racks as well as in the plant in general, and require equipment for dumping and for transporting the forms back to the beginning of the process.

The present invention relates to a method and apparatus for forming such fabric-reinforced panels in a continuous operation on a conveyor belt but employing a web of thin carrier/release material under the panels thereby eliminating the use of molds, plates or other forms.

SUMMARY OF THE INVENTION

In the present invention a novel method and apparatus have been found for producing fabric-reinforced, thin, lightweight concrete construction panels on a continuous basis, which eliminate the use of molds, plates or other forms as well as the equipment for handling the forms. The panels comprise a layer of reinforcing fabric bonded by means of a layer of a hydraulic cement slurry, to the top and bottom surfaces of a core of lightweight aggregate and hydraulic cement. In a preferred embodiment of the invention the reinforcing fabric is a woven mesh of glass fiber yarns coated with a protective material such as polyvinyl chloride resin. I have found that the molds or the like can be eliminated by using a thin web of a disposable carrier/release material such as paper coated with a release agent, if also the individual panels are stacked at the end of the forming operation by means of an air-float unit of novel design. The carrier material is laid down on the conveyer belt at the beginning of the forming section, the components of the panel are then deposited on the carrier material, the continuous green, uncured strip so formed is cut into individual panels, and the panels are then stacked for curing. However, the freshly formed, green panel, as well as its sheet of disposable carrier material, is soft, limp and tender and easily disrupted and therefore does not lend itself to conventional stacking operations. But with my air-float unit the stacking of the freshly formed panels is achieved successfully.

The air-float unit consists of an air-frame with an air-film cover which is divided into two slidable halves, an opening in said frame slightly larger in dimensions than the panels delivered to it, an adjustable lift table positioned beneath said opening to receive the panels and form a stack, and a number of open orifices positioned in the walls of said opening which orifices are supplied with high-volume, low-pressure air. A cushion of air is trapped by the walls of the frame, by the stack below and the two covers and the panel being stacked.

As will be apparent my air-float stacking unit can be used to stack not only the uncured fabric-concrete composite panels but also other similar limp or soft, flat objects which are difficult to stack without damaging or destroying such.

In the stacking operation each panel is transferred onto the cover of the air-frame while floated by an air-film, the two halves of the cover are moved apart, and the panel together with its carrier sheet eases down or settles on to the stack while supported by the trapped air-cushion. With the air-cushion, at most, only a slight bending of the panel occurs, insufficient to disrupt the layers. The freshly formed panels are sufficiently supple that even if a slight bowing occurs in a panel it will flatten out upon the panel or pallet board beneath it on the lift table.

The production of fabric-reinforced concrete panels by means of my invention has very substantial advantages over prior methods. Once the panels are stacked at the end of the production line, as in a stack of ten or twenty five panels, or other number as desired, they need not be handled individually until they reach the user. The stack of panels is moved as a unit into the curing area and held until the curing of the panels is sufficiently complete, then moved to the banding area where runners are, or a pallet is, positioned under the stack and steel strapping or other banding applied, and finally moved into the warehouse or shipping area.

It is an object of this invention to simplify the process and apparatus for producing fabric-reinforced concrete panels.

It is a further object of this invention to eliminate the use of forms, such as molds, plates, etc., in the apparatus, and the need for certain steps in the process, for producing fabric-reinforced concrete panels.

It is an object of this invention to reduce the amount of handling of the panels and the amount of labor required thereby reducing the cost of manufacture.

It is a further object of this invention to provide an improved means of stacking freshly formed concrete panels as well as other soft, limp substantially flat objects which are easily damaged.

DESCRIPTION OF THE PRIOR ART

U.S. Pat. No. 3,284,980 (Dinkel) describes a method of forming fabric-reinforced thin concrete panels by successively depositing the several layers in a form or mold and allowing the panel to cure in the mold. The panels must then be removed from the molds, as by over-turning, and stacked or otherwise arranged for shipping. This involves considerable labor in dumping the molds, cleaning them and applying a concrete release agent to the casting surfaces. It involves a slow and cumbersome operation.

U.S. Pat. No. 3,509,010 (Metzger) describes a method of producing a construction panel made up of a layer of expanded clay particles and hydraulic cement with a covering of sheet metal or a covering of fabric, preferably a glass fiber mat, bonded to one or both sides of the layer. In the disclosed method the composite of glass fiber mat and layer of expanded clay and hydraulic cement is formed in a continuous strip, then cured and hardened and finally cut into pieces. This reference discloses nothing concerning stacking of freshly formed panels or the use of a separator/carrier sheet between panels.

U.S. Pat. No. 3,608,003 (Klaue and Metzger) describes a method and apparatus for producing lightweight construction panels composed of a layer of expanded aggregate and hydraulic cement, covered on one or both faces with a mat of glass fibers impregnated with hydraulic cement. However, the panels are formed in a mold, the molds being moved on a roller conveyer under a forming station. The molds must then be stacked for curing, unstacked and emptied after the panels are hardened, and returned to the roller conveyer. This is an inefficient operation which requires considerable excess equipment in the way of tracks, carriages, lifting devices and the like for handling the molds. The stacking of uncured, limp concrete panels is not disclosed.

U.S. Pat. No. 4,112,173 (Roudebush and Thompson) discloses the use of polyethylene coated paper and paperboard as a liner in the casting of tilt-up concrete slabs where one slab is cast in place on top of another. The casting sheet provides easy release of one concrete slab from another when medium or high density polyethylene is used. This patent does not pertain to the handling of thin, uncured panels.

U.S. Pat. No. 4,159,361 (Schupack) discloses a fabric-reinforced concrete panel and a method of making the same in which the panels are formed one on top of the other from a reciprocating fabrication train, see FIG. 6 and FIG. 7 and columns 6 and 7. A bond release curing agent is sprayed over the top surface of one panel before the next panel is formed on it.

While these prior art references disclose the production of fabric-reinforced concrete panels none of them discloses forming the panels on a disposable carrier sheet in a continuous operation and transferring the cut, freshly formed panels to a stack for curing and subsequent shipping. Further, none of the references relate to the use of an air-cushion for achieving the stacking of the soft, limp, freshly formed panels.

DETAILED DESCRIPTION OF THE PREFERRED EMBODIMENTS

Figure 1:
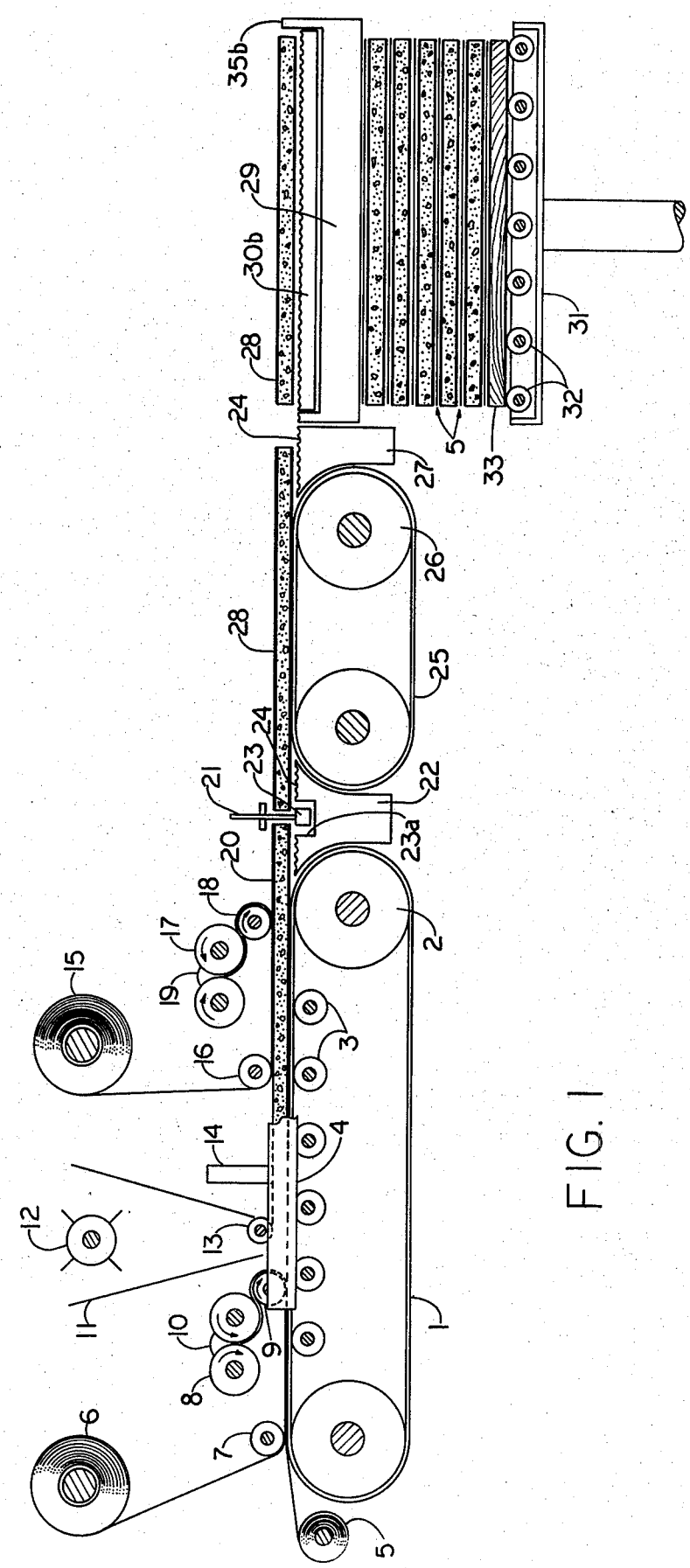
FIG. 1 is a schematic front elevation view showing a preferred embodiment of the apparatus according to the present invention.

Referring to FIG. 1, the forming station comprises a continuous conveyer belt 1, driven by one of the belt rollers 2, suitably supported by table rolls 3 or the like, side rails 4 which serve to form the edges and determine the width of the concrete strip 20 being formed, a pair of nip rolls 8 which, together with end dams (not shown), and a transfer roll 9, serve to apply a controlled layer of portland cement slurry 10, chute 11 together with distributor wheel 12 and compaction roller 13 serve to feed a uniform layer of core mix onto the conveyer, reciprocating screed 14 which serves to smooth and provide the final control of the thickness of the core layer, and a second pair of nip rolls 17, together with end dams (not shown) and transfer roll 18, serve to apply the top layer of portland cement slurry 19 to the concrete strip 20, being formed.

A cutting station, shown in FIG. 1, consists of an air-film transfer table 22, a reciprocating cutter 21, and a replaceable cutting bed or block 23. The air-film transfer table 22, is provided with a number of counter-sunk orifices 24, spaced a few inches apart across its entire working surface and is supplied with a high volume flow of low-pressure air by means of a centrifugal blower (not shown). This unit through its orifices 24, provides an air-film which serves to support the fabric-reinforced concrete strip and the cut panels as they are transferred from belt 1 to belt 25.

Such air-film tables are supplied by various manufacturers, for example, Southworth Machine Co. of Portland, Maine. The diameter of the orifices 24, their spacing and the flow of air will vary according to the size and weight of the panel being conveyed. In a typical installation the orifices are 3/16 inch in diameter, counter-sunk and spaced 4 inches on center. The pressure of the air stream normally is 1 to 2 p.s.i.

The cutter 21, can be a rotating disc or a blade and preferably is operated as a traveling shear or cutter, that is moving diagonally across the moving strip, so as to sever panels with a right angle cut.

The cutter is indexed by electronic controls to cut the strip at certain intervals and can be set to cut panels of any desired length.

Block 23 serves as a non-abrasive cutting bed and has a surface of hardwood, high durability plastic or the like. It is held in the recess 23a by means of a friction fit or other easily releasable means so that it can be replaced very quickly when the surface becomes worn. Block 23 is held to a narrow width to minimize the surface taken from the air-film table.

Conveyer belt 25, driven by roller 26, serves as a transfer mechanism to deliver the individual panels from the cutting station to the stacking unit. The transfer operation is augmented by air-float unit 27, similar to table 22. Its working surface is provided with a large number of orifices 24, preferably counter-sunk, and supplied with a high volume flow of low-pressure air. An air-film is provided under the panel to float it across to the stacking unit.

Alternatively a second transfer belt and air-film table, similar to conveyer 25 and unit 27, but not shown, can be used; it would be intermittently operated faster than belt 25 to speed up delivery of a panel to the stacking device and then slowed to the speed of belt 25 to receive the next panel. Normally this transfer section is longer than the first one in order to facilitate the speed changes.

The air-float stacking unit consists of an adjustable lift table 31 and an air-frame 29; two sliding covers 30a and 30b of the air-frame 29 form an air-film table which receives the panels to be stacked. The stacking device is shown in detail in FIG. 2, FIG. 3 and FIG. 4.

Figure 2:
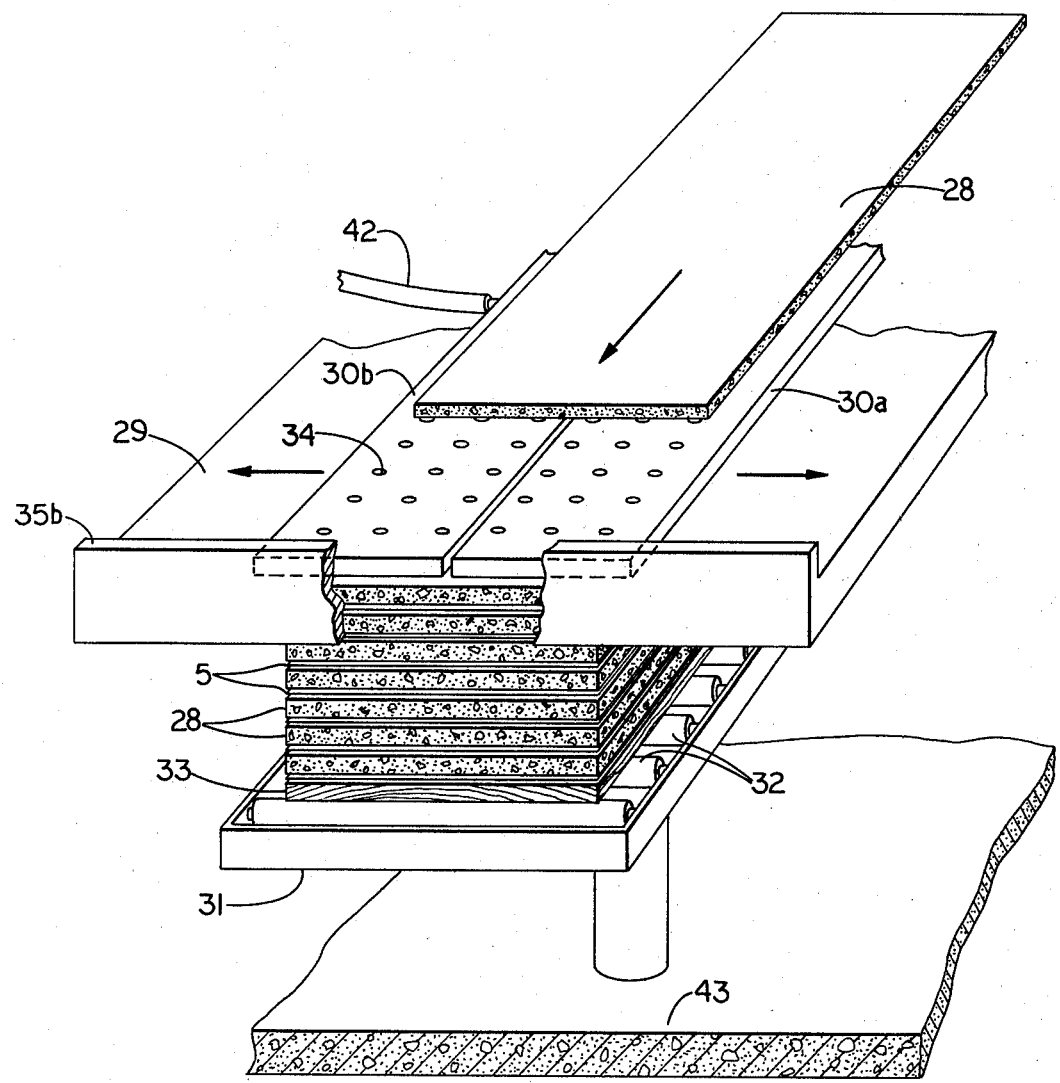
FIG. 2 is a perspective view of the air-float stacking unit of the present invention illustrating its operation.
Figure 3:
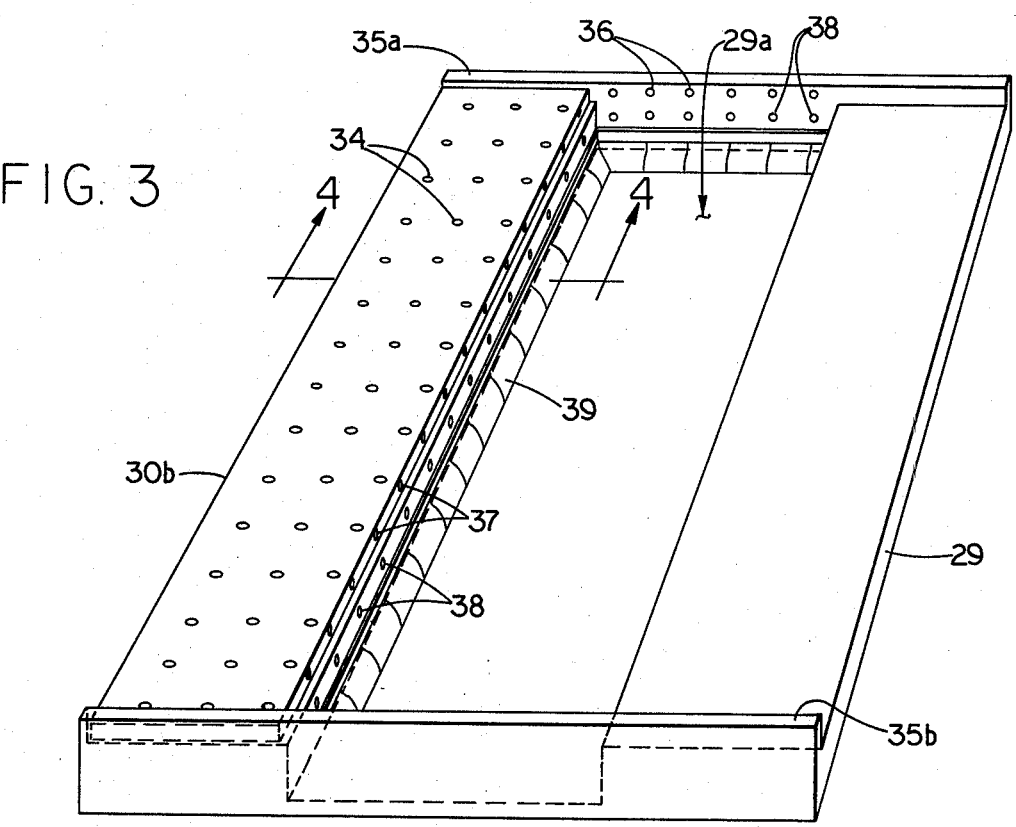
FIG. 3 is a perspective view in part of the air-frame of the stacking unit shown in FIG. 2.

As shown in FIG. 2 and FIG. 3, air-frame 29 has an opening 29a the shape of the panel being produced and slightly larger in length and width than the size of the panel with only a minimum clearance around the four edges of the panel. A large number of orifices 38 are provided along at least one pair of the opposing walls of the opening and preferably along all four of the walls.

Figure 4:
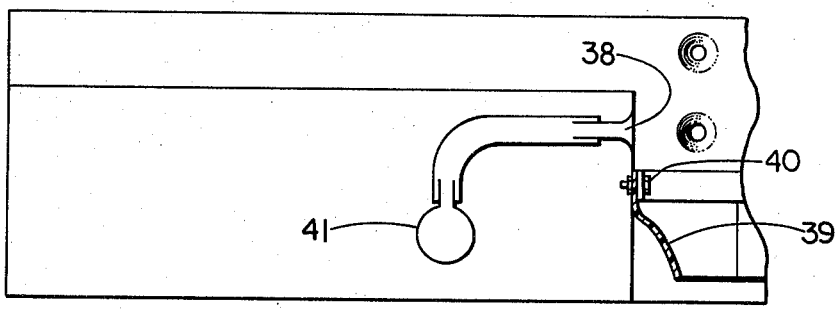
FIG. 4 is a sectional elevation taken along the line 4—4 in FIG. 3.

These orifices are placed close to the top of each such wall of the opening, as per FIG. 4.

Additionally, an inwardly arched baffle 39 is attached along the length of each of the four walls of the opening to form a seal around the edges of the stacked panels or of the pallet board 33. The baffles are of spring steel or other suitable metal or plastic such as will permit them to remain in firm, flexed contact against the edges of the stacked panels despite the air pressure used to cushion the stacking of the panels.

Air-frame 29 is provided with an air-film table comprised of two covers 30a and 30b whose upper surfaces are equipped with orifices 34 fairly closely spaced, for example, 3 inches to 5 inches apart. High-volume low-pressure air is supplied as through tubing 42 to the orifices thereby creating an air-film under each panel 28 as it is transferred to the stacker. The two covers are slidable, one to each side. Initially the two covers are closed; when delivery of a panel 28 to the air-film table is completed the two covers are moved apart quickly to settle the panel, cushioned by the trapped air layer, on to the stack or pallet board 33 as the case may be. The open position, with only one cover half shown, is illustrated in FIG. 3.

Frame 29 is provided with a rail 35a at the entry end of the stacking unit and rail 35b at the opposite end. These two rails serve as guides for the covers 30a and 30b. The top edge of rail 35a is flush with, or slightly below, the top of the two covers, but rail 35b extends above the top surface of the covers, serving when needed, as a back stop for an arriving panel.

Alternatively, the two rails 35a and 35b are equipped with orifices 36, fed with pressurized air to augment the air cushion under the panel when the two covers are withdrawn to the opposite sides of the frame. Flow of the air to the orifices can be initiated when the electronic signal to open the covers is actuated.

The two covers 30a and 30b are provided with orifices 37 on the inside edge of each, suitably supplied with pressurized air. The air is turned on when needed to provide added air support along the center line of a panel as the covers are moved apart.

The pressurized air fed through orifices 37 and 38, not only augments the air layer under covers 30a and 30b and the panel, but also provides air seals along the rails and under the covers, to reduce the escape of the air cushion from inside the air-frame.

A separate set of orifices (not shown) located on the bottom surface of covers 30a and 30b can be used to provide an air seal under said covers.

The number of orifices, their size and spacing and the volume of air supplied will vary according to the weight of the panels or other flat objects being transported and stacked. In general, the orifices are open holes from 1/16" to ¼" in diameter, counter-sunk, for example ⅜", to provide a puddle of air at each orifice, spaced as needed, for example 4" on center. The orifices, as number 38 in FIG. 4 are fed from a manifold 41 which in turn is supplied from a high-volume centrifugal air blower (not shown). A low air pressure of about one-half to two pounds per square inch at the orifice normally is adequate. However, where an air sealing action is needed as at orifices 36 along rails 35a and 35b and at orifices 37 along the edge of covers 30a and 30b to prevent bowing of the panel, higher pressures may be required.

The air cushion which serves to lower the uncured panels on to the stack without damage consists of the air trapped between the top surface of the stack (as the top of a previously deposited panel or the top of pallet board 33) and the bottom of a panel being deposited on the stack. As can be visualized from FIG. 3 and FIG. 4, the cushion of air between the top of the stack and the bottom of the next panel, is maintained by the high volume flow of air from orifices 38 while being confined by the four walls of the opening 29a in the air-frame, the baffles 39 which bear upon the four edges of the stacked panels and thereby act as air seals, and as needed, by the air jets from orifices 36 on the inside of rails 35a and 35b and orifices 37 on the inner edge of each of the two covers 30a and 30b. The lift table 31 is operated to hold the distance between the top of the stack and the bottom of covers 30a and 30b at a minimum, only a small fraction of an inch. When a panel 28 is to be deposited upon the stack the covers 30a and 30b are opened quickly to minimize escape of the air cushion.

The foregoing described arrangement of orifices in the stacking device provides the means for adjusting the air cushion to handle panels of different weights and different degrees of stiffness (or lack of stiffness). The air cushion is adjusted to support the panel first along the center line as the two supporting covers are withdrawn, minimizing the tendency of the panel to bow or sag. Next the flow of air from the various orifices must be adjusted to provide a substantially uniform support under the panel, but not sufficient to prevent the settling of the panel on to the stack. Thus, in the operation of the stacker, a balance is established between inflow and outflow of air in the air-frame such that the rate of escape of the air is slightly in excess of the flow of air supplied by the various orifices.

In the operation of the preferred embodiment of my process (see FIG. 1), a web of disposable carrier material 5 is fed on to moving conveyer belt 1, a web of reinforcing fabric 6 passes under spreader roll 7 and is laid on the disposable carrier material, a layer of portland cement slurry is applied to the fabric by means of transfer roll 9 which in turn is supplied from a pool of slurry 10 held between two nip rolls 8, a core mix of lightweight aggregate, portland cement and water, of a no-slump consistency is dropped from a conveyer belt (not shown) along distributor wheel 12 extending between the side walls (not shown) of chute 11, which scatters a more or less even layer of mix between side rails 4 and is compacted and leveled as it passed under roll 13, and, if further leveling is needed, is screeded by reciprocating bar 14, a second web of reinforcing fabric 15, which may be the same fabric as 6, or may be a different material depending upon the panel properties desired, is laid on top of the core mix, a top layer of portland cement slurry is applied to the fabric 15 by means of transfer roll 18 to cover the fabric and bond it to the core layer, the thus formed strip 20 including the disposable carrier web is cut on signal to sever a panel of desired length, while supported by an air-film, the panel is transferred to an air-film table formed of two sliding covers 30a and 30b, the panel while supported by an air cushion confined by an air-frame 29, is stacked upon an adjustable lift-table 31, said air cushion serving to hold the panel substantially in a horizontal plane as it settles on to the stack, the stack of panels is transferred to a curing operation.

The air-film and air cushion thus make it possible to convey and to stack a wet, uncured panel without the need of a rigid support such as a mold, plate or other form. As the two covers 30a and 30b of the stacker are drawn apart, the air-film from the surface orifices allows movement of the covers without any abrading or tearing action on the bottom of the panel or its disposable carrier web. The air cushion minimizes bowing in the center of the panel thereby avoiding impairment of the panel as it is deposited on the stack.

The web of disposable carrier release material can be a web of paper treated with a release agent such as a silicone, a Werner complex, a fatty acid compound or the like, suitable for concrete form release, or a web of paper coated on one or both sides with polyethylene or polypropylene, or a thin film of plastic per se having release properties, such as 2 mil or 2½ mil polyethylene, Teflon (tetrafluoro-ethylene) and polypropylene. A web of well sized kraft paper or of wet strength kraft paper of a basis weight in the range of 30 to 60 pounds, treated with a fatty acid type concrete release compound such as "Nox-Crete" brand form coating, produced by the Nox-Crete Chemical Co. of Omaha, Nebraska, on both surfaces, is preferred. The release compound advantageously is applied by passing the web between two release agent applicator rollers as it is being fed to the conveyer belt.

The web of carrier material 5 is of a width greater than the panel being produced, having a narrow exposed strip on each side. The excess web on each edge travels under the side rails 4 which are suitably spaced above the conveyer belt to provide clearance for the web. The web of disposable material serves a dual function, first as a carrier for the concrete strip as it is formed on the conveyer belt and cut, and for the panels as they are transported and stacked, and second, as a separator sheet between the panels to permit, after curing, the release of one panel from another as they are taken from the stack by the user. The excess width of the web facilitates separating the panels.

A light layer of a set-off material, such as a fine sand or fine plastic particles, spread over the top surface of the panels prior to being stacked, as at the transfer station or at the stacking station, can be used to facilitate separation of the cured panels.

The reinforcing fabric in the preferred embodiment is a web of woven glass fiber yarns. The yarns are coated with a polyvinyl chloride resin or other protective thermoplastic polymer, woven and then heat set. The fabric must be sufficiently open to permit the portland cement slurry to penetrate and bond the fabric to the core. Typically the glass fiber mesh used is a 18×14 or 21×12 yarn count per inch. Other high strength fabrics such as one of nylon filaments or a vinyl coated polyester yarn mesh can be used.

Although various hydraulic cements can be used, in the preferred embodiment of this invention portland cement is used. Any conventional lightweight aggregate such as expanded shale, clay and slag, volcanic ash, cellular ceramic spheres, and the like, can be used. However, expanded shale appears to have the best properties for the panels described herein.

The lift-table 31 is shown in the figures as a hydraulic elevator, but this is by way of example; the lift can be a scissor table or other unit which can be indexed up or down to receive the panels.

In the stacking operation a pallet board 33, i.e., a flat sheet or plate of plastic, wood or metal, is laid on the top of the lift-table 31 to provide a flat support. After the desired number of panels have been accumulated in the stack, the lift-table is lowered to the level of a take-away conveyer, fork lift or the like and the stack is rolled off over rollers 32 and transported to a curing area. When the panels are cured and hardened, as after 24 hours, the stack is conveyed to a banding station where it is turned over as a unit on to runners (two or more) or on a pallet, the board 33 is removed and the stack is strapped to the runners or a pallet ready for warehousing or shipping.

While the process is a continuous one in the sense that the flow of materials and product can be continuous there may be momentary interruptions in the flow, as when a cut is made in the continuous strip or when the cover members on the air-frame are opened and closed as a panel is stacked.

The orifices 34 on the top of the air-film table covers 30a and 30b are arranged in two or more banks in each cover and are equipped to be operated independently or in concert. These banks provide a means of controlling the speed of a panel as it is delivered to the air-film table. The volume of air furnished to the banks of orifices can be adjusted to provide a diminished flow in any area to control the forward movement of a panel. With a reduced air-film under the panel a braking action is obtained. As an example, the banks at the far end of the covers, nearest rail 35b, can be operated at a lower volume of air than the banks at the receiving end of the air-film table, to slow the forward movement of the panel. Alternatively the flow of air to all of the orifices can be maintained at the normal level until the delivery of a panel is substantially completed at which time the air flow is cut off to arrest the forward movement of the panel. The air flow to the orifices 34 is than resumed for the stacking step.

What is claimed is:

1. A process for producing fabric-reinforced concrete panels which comprises depositing a web of disposable carrier material on a conveyer belt laying down a continuous strip of fabric-concrete composite by successively depositing on said carrier web a web of reinforcing fabric a layer of hydraulic cement slurry a core mix consisting of lightweight aggregate, hydraulic cement and water a web of reinforcing fabric, and a layer of hydraulic cement slurry cutting said strip including said carrier web into individual panels transferring each panel seriatim to an air-float stacking unit positioned over a stacking table adapted to support said panels, said stacking unit including an air-film cover of an air-frame having a slightly larger than panel size opening and a substantially confined space therebelow within which a cushion of air may be developed, withdrawing rapidly the air-film cover from beneath the panel while providing air cushion under the panel in said space thereby obviating bowing or sagging of the panel in movement through the opening and into said space for stacking on said stacking table, and transferring the stack of panels wherein each panel is separated from an adjacent panel in the stack by a layer of said disposable carrier material to a curing operation.

2. A process for the production of fabric-reinforced concrete panels which comprises depositing on a moving conveyer belt a web of disposable carrier material, forming on said carrier web a continuous strip of uncured, fabric-reinforced concrete, cutting said strip including said carrier web into panels, transferring one panel at a time to an air-film cover of an air-frame positioned over a stacking table, said air-frame having a slightly larger than panel size opening and a substantially confined space therebelow within which a cushion of air may be developed, withdrawing the support of said air-film cover from beneath the panel thereby settling the panel through said opening and into said space, while simultaneously providing said air cushion inside said space which supports the panel in a substantially horizontal plane to obviate bowing or sagging as the panel moves toward the stacking table during the stacking of said panel, and curing the stack of panels so formed.

3. The process of claim 2 wherein a flow of high-volume low-pressure air is delivered into the space inside said opening of said air-frame from orifices on the inner walls of said air-frame to provide said air cushion.

4. The process of claim 2 wherein the air-film cover is divided into two members and a flow of pressurized air is delivered under said panel from orifices on the opposing inside edges of the two cover members.

5. The process of claim 2 wherein a flow of pressurized air is delivered under the bottom surface of the cover to reduce escape of said air cushion.

6. The process of claim 2 or 1 wherein said strip of fabric-reinforced concrete is supported on an air-film table as it is cut into panels.

7. An apparatus for producing fabric-reinforced concrete panels comprising a forming section consisting of a continuous conveyer belt, means for depositing on said belt a web of disposable carrier material, means for depositing on said web of carrier material a continuous strip of uncured, fabric-reinforced carrier, a cutting station consisting of an air-film transfer table and a cutting member positioned above said air-film table to sever panels of a given length from said strip, a panel transfer station consisting of a continuous conveyor belt and a contiguous air-film transfer table, and, a stacking unit consisting of an adjustable lift-table, an air-frame positioned above said lift-table including a plurality of walls to define a space and an opening the shape of said panels, but slightly larger both in length and width than said panels, said air-frame being provided with a divided air-film cover over said opening to receive said panels one at a time from said transfer station, means for slidably opening said air-film cover thereby depositing said panel on said lift-table, and air orifice means on the inside of said air-frame communicating with said space to provide an air cushion under each said panel to support the panel in a substantially horizontal plane free of any impairing bowing or sagging as it is deposited, said air orifice means operative substantially simultaneously with the opening of said cover.

8. An apparatus for producing fabric-reinforced concrete panels comprising a forming section consisting of an continuous conveyer belt, means for depositing on said belt a web of disposable carrier material, means for successively depositing on said carrier material a web of reinforcing fabric, a layer of portland cement slurry, a layer of lightweight concrete core mix, a web of reinforcing fabric and a layer of portland cement slurry to form a continuous strip of fabric-concrete composite, a cutting station consisting of an air-film table and a traversing cutting member positioned above said table to sever panel lengths from said strip, a panel transfer station consisting of a continuous conveyor belt and a contiguous air-film table, and a stacking unit consisting of an adjustable lift-table, an air-frame positioned above said lift-table including a plurality of walls to define a space through which panels move to said lift-table, said space being only slightly larger than the dimension of said panels, a divided air-film cover of two sliding members disposed over an opening to said space and which cover receives panels from said transfer station, means for slidably opening said divided cover, and air-orifice means on the inside of said air-frame communicating with said space to provide an air cushion under each panel to support the panel in a substantially horizontal plane free of any impairing bowing or sagging as it is deposited, said air orifice means operating substantially simultaneously with the opening of said cover.

9. An apparatus according to claim 8 wherein each of said sliding cover members of said air-frame is provided with air orifices on its inner edge thereby providing opposing air streams as the cover members are moved apart.

10. An apparatus according to claim 7 or 8 wherein an inwardly extending baffle is secured along the length of at least one wall defining said space of said air-frame, each baffle being disposed to contact an edge of a pallet board of said lift-table or of a panel on said lift-table.

11. The apparatus according to claim 7 or 8 wherein the cutting station air-film table, is provided with a recess to receive a replaceable cutting bed member.

12. An apparatus according to claim 7 or 8 wherein said walls of said air-frame include a rail member at each end which serves as a guide for said air-film cover members.

13. An apparatus according to claim 12, wherein said air orifice means includes a plurality of air orifices disposed in said rail members of said air-frame.

14. An air-float unit for stacking soft, limp, flat objects which comprises an adjustable lift-table to receive a stack of said flat objects, an air-frame including a plurality of walls to define a space positioned over said lift-table, said space in said air-frame conforming to the size and shape of said flat object but of slightly larger dimensions to accommodate passage of said flat object therethrough to said lift-table, an air-film table covering an opening to said space and positioned to receive one of said flat objects at a time from a conveyer system, said air-frame table being divided lengthwise into two members, said members being slidably movable apart to uncover said opening, and air orifices inside said air-frame communicating with said space to provide air cushion under said flat object thereby to maintain said flat object in substantially a horizontal plane free of any impairing bowing or sagging as it settles on said lift-table, said air cushion being provided substantially simultaneously with the movement of said members.

* * * * *